United States Patent Office 2,794,311
Patented June 4, 1957

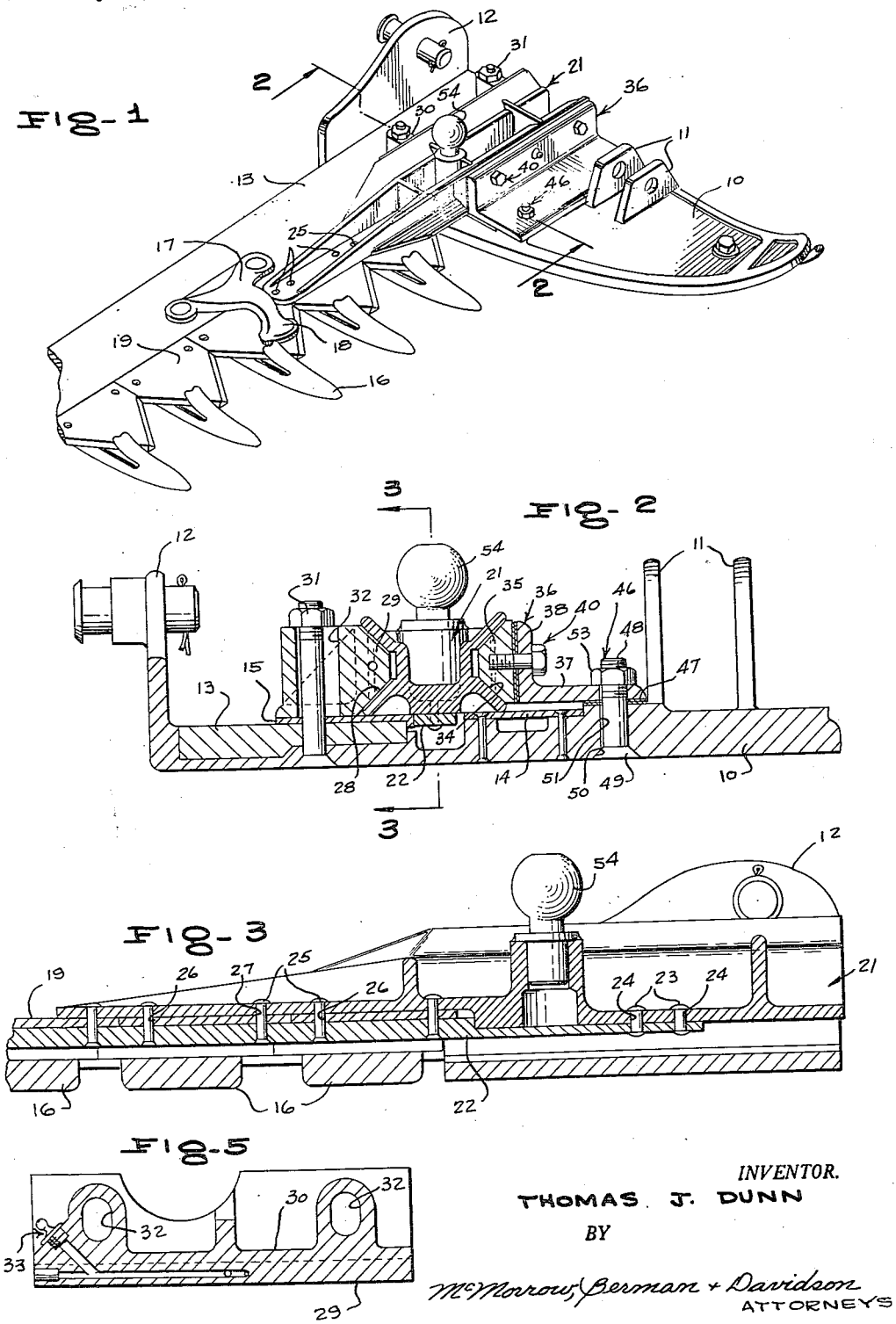

2,794,311

CUTTER KNIFE HEAD CONSTRUCTION FOR A MOWER CUTTER ASSEMBLY

Thomas J. Dunn, Hackettstown, N. J., assignor to Howard H. Samuel, Inc., Hackettstown, N. J., a corporation of New Jersey Application May 27, 1955, Serial No. 511,586

4 Claims. (Cl. 56—303)

This invention relates to a cutter knife head construction for a mower cutter assembly.

An object of the present invention is to provide a cutter knife head construction for a mower cutter assembly in which the head may be adjusted relative to the cutter bar by a single adjustment.

Another object of the present invention is to provide a cutter knife head construction for a mower cutter assembly which may be adjusted relative to the cutter bar and to the shoe.

A further object of the present invention is to provide a cutter knife head construction for a mower cutter assembly which is simple in structure, positive in action, and commercially feasible.

Other objects and advantages of the present invention will become apparent from the following description taken in conjunction with the accompanying drawings, in which:

Figure 1 is a perspective view, with a part broken away, of a mower cutter assembly having the knife head construction of the present invention associated therewith.

Figure 2 is an enlarged sectional view taken on the line 2—2 of Figure 1.

Figure 3 is a sectional view taken on the line 3—3 of Figure 2.

Figure 5 is a sectional view taken on the line 5—5 of Figure 4.

Figure 4:
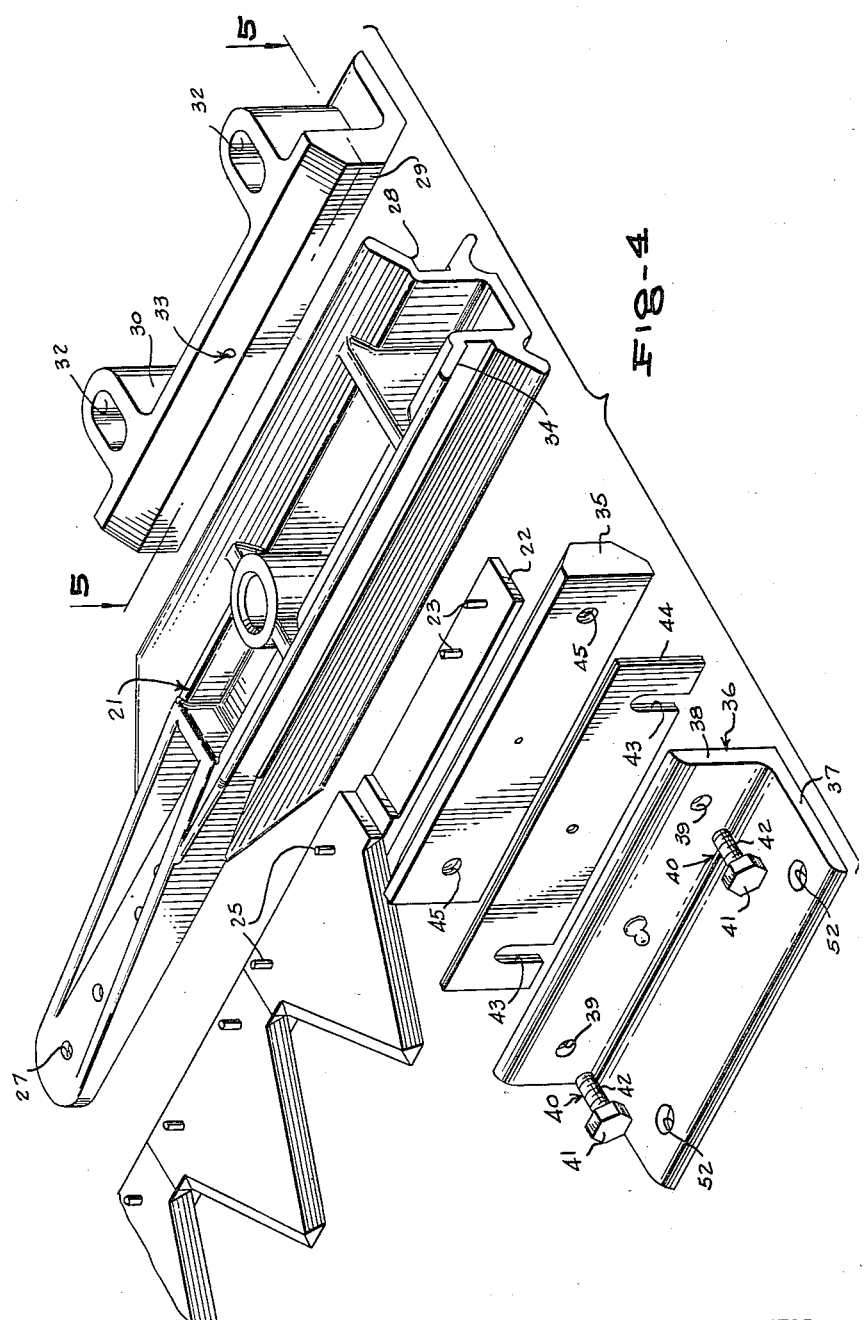
Figure 4 is an enlarged exploded view of the knife head construction of the present invention.

Referring to the drawings, the numeral 10 designates a shoe which carries a pair of spaced lugs 11 inwardly of and spaced from the forward end thereof and an abutment member 12 rising from the rearward end of the shoe, the lugs and abutment member being attachable to a mobile vehicle or tractor. A cutter bar 13 is arranged transversely of the shoe 10 and has a portion adjacent its inner end supported upon the shoe adjacent the rearward end of the latter. A front wear plate 14 is supported upon the shoe 10 and a rear wear plate 15 is supported upon the cutter bar 13. The cutter bar 13 is provided with a plurality of guards which project from the front edge thereof.

Mounted in coacting relation with respect to the cutter bar 13 is a cutter knife 19 which is held in its coacting relation by engagement of a projection 18 carried by a knife clip 17 carried by the cutter bar 13. The portion of the cutter knife 19 adjacent the inner end is fixedly attached to a head 21. The head is superimposed upon the shoe 10, so that its rearward side overlies the cutter bar 13 and is adjacent the rearward end of the shoe with the forward side of the head inwardly of and spaced from the forward end of the shoe, the head being movable with respect to the cutter bar 13 and the shoe 10. Specifically, the connection of the knife 19 to the head 21 comprises a slide bar 22 which is positioned on the under face of the head 21 and extends longitudinally between the front and rear wear plates 14 and 15, the bar carrying a pair of upstanding rivets 23 which extend through complemental openings 24 formed in the head 21 and have their free ends turned over to fixedly attach the bar 22 to the head 21. The bar 22 is also provided with a plurality of upstanding rivets 25 arranged in longitudinal spaced relation, the rivets 25 extending through complemental openings 26 formed in the portion of the cutter knife 19 adjacent its inner end, and openings 27 formed in the head 21, the free ends of the rivets 25 being turned back upon the head 21 to fixedly secure the cutter knife to the head.

The head 21, on its rearward side, has a first slideway 28 in which is slidably received a first guide 29 carried by a support 30 which is positioned between the rearward side of the head 21 and the rearward end of the shoe 10. The support 30 is fixedly secured to the cutter bar 13 and shoe 10 by means of bolt and nut assemblies 31 supported in spaced sockets 32 formed in the support. It is to be noted that the sockets 32 are of oval formation in cross section, thereby permitting limited adjustment of the support 30 relative to the head 21. The support 30 is also provided with means for lubricating same, such means being generally indicated by the numeral 33.

On the forward side of the head 21 there is a slideway 34 in which is slidably received a second guide 35 which is adjustably connected to a support 36, the support 36 being also adjustably connected to the shoe 10. Specifically, the support 36 embodies a horizontal leg 37 resting upon the shoe 10 and a vertical leg 38, the leg 38 being provided with openings 39 through which extend bolts 40. Each bolt 40 has a head 41 which bears against the outer face of the vertical leg 38 of the support 36, and a threaded shank 42. The threaded shanks 42 of the bolts 40 extend freely through the openings 39 in the leg 38 of the support 36 and loosely through the complemental slots 43 formed in shims 44 and have their free end portions threadedly engaged by complemental threaded openings 45 formed in the guide 35. By this arrangement, the head 21 may be adjusted relative to the cutter bar 13 to thereby enable the wear of either the guide 35 or the guideway 34 or both the guide 35 and the guideway 34 to be suitably compensated of by simply loosening the bolts 40 and slipping an additional shim or shims 44 on the threaded shanks 42 of the bolts 40 and then tightening down the bolts 40. The horizontal leg 37 of the support 36 is also adjustably connected to the shoe 10, by means of bolts 46 carried by the shoe 10, the bolts extending through shims 47 and the leg 37 of the support 36. Specifically, each of the bolts 46 embodies a threaded shank 48 and a head 49 on one end thereof, the head being fixedly supported in a complemental recess 50 formed in the under face of the shoe 10. The threaded shanks 48 of the bolts 46 extend freely through complemental openings 51 formed in the shoe 10 and freely through complemental openings formed in the shims 47, and through complemental openings 52 formed in the horizontal leg 37 of the support 36, the free end portions of the threaded shanks 48 of the bolts 46 being engaged by nuts 53. By this arrangement, the head 21 may be adjusted relative to the cutter bar 13 or front and rear wear plates 15 carried by the shoe 10 by removing the nuts 53, lifting the support 36 free from the guideway 34 of the head 21, applying either additional shim or shims 47 to the threaded shanks 48 or withdrawing some of the shims 47 from the threaded shanks 48, and then replacing the support 36 and the nuts 53.

The head 21 is also provided with a ball 54 to which the driving means or pitman may be connected for effecting the reciprocatory movement of the head and the cutter knife 19 carried thereby.

Having thus described the invention what is new and desired to be secured by Letters Patent is:

1. In a mower cutter assembly, a shoe having a forward end and a rearward end, a cutter bar having an inner end arranged transversely of said shoe and having a portion adjacent said inner end supported upon said shoe adjacent its rearward end, a head having a rearward side and a forward side superimposed upon said shoe so that the rearward side overlies the cutter bar and is adjacent the rearward end of said shoe with the forward side inwardly of and spaced from the forward end of said shoe and movable with respect to said cutter bar and said shoe, a cutter knife having an inner end mounted in coacting relation with respect to said cutter bar with a portion adjacent its inner end connected to said head for movement therewith, a first slideway on the rearward side of said head, a first support positioned between the rearward side of said head and the rearward end of said shoe, a first guide carried by said support and slidably engageable with said first slideway, means securing said support relative to said shoe, a second slideway on the forward side of said head, a second support positioned between the forward side of said head and inwardly of and spaced from the forward end of said shoe, a second guide slidably engageable with said second slideway and adjustably connected to said second support, and means adjustably securing said second support relative to said shoe.

2. In a mower cutter assembly, a shoe having a forward end and a rearward end, a cutter bar having an inner end arranged transversely of said shoe and having a portion adjacent said inner end supported upon said shoe adjacent its rearward end, a head having a rearward side and a forward side superimposed upon said shoe so that the rearward side overlies the cutter bar and is adjacent the rearward end of said shoe with the forward side inwardly of and spaced from the forward end of said shoe and movable with respect to said cutter bar and said shoe, a cutter knife having an inner end mounted in coacting relation with respect to said cutter bar with a portion adjacent its inner end connected to said head for movement therewith, a first slideway on the rearward side of said head, a first support positioned between the rearward side of said head and the rearward end of said shoe, a first guide carried by said support and slidably engageable with said first slideway, means adjustably securing said support relative to said shoe, a second slideway on the forward side of said head, a second support positioned between the forward side of said head and inwardly of and spaced from the forward end of said shoe, a second guide slidably engageable with said second slideway and adjustably connected to said second support, and means adjustably securing said second support relative to said shoe.

3. In a mower cutter assembly, a shoe having a forward end and a rearward end, a cutter bar having an inner end arranged transversely of said shoe and having a portion adjacent said inner end supported upon said shoe adjacent its rearward end, a head having a rearward side and a forward side superimposed upon said shoe so that the rearward side overlies the cutter bar and is adjacent the rearward end of said shoe with the forward side inwardly of and spaced from the forward end of said shoe and movable with respect to said cutter bar and said shoe, a cutter knife having an inner end mounted in coacting relation with respect to said cutter bar with a portion adjacent its inner end connected to said head for movement therewith, a first slideway on the rearward side of said head, a first support positioned between the rearward side of said head and the rearward end of said shoe, a first guide carried by said support and slidably engageable with said first slideway, means securing said support relative to said shoe, a second slideway on the forward side of said head, a second support embodying a horizontal leg and a vertical leg positioned between the forward side of said head and inwardly of and spaced from the forward end of said shoe with the horizontal leg resting upon said shoe and the vertical leg facing said second slideway, a second guide slidably engageable with said second slideway and adjustably connected to the vertical leg of said second support, and means adjustably securing the horizontal leg of said second support relative to said shoe.

4. In a mower cutter assembly, a shoe having a forward end and a rearward end, a cutter bar having an inner end arranged transversely of said shoe and having a portion adjacent said inner end supported upon said shoe adjacent its rearward end, a head having a rearward side and a forward side superimposed upon said shoe so that the rearward side overlies the cutter bar and is adjacent the rearward end of said shoe with the forward side inwardly of and spaced from the forward end of said shoe and movable with respect to said cutter bar and said shoe, a cutter knife having an inner end mounted in coacting relation with respect to said cutter bar with a portion adjacent its inner end connected to said head for movement therewith, a first slideway on the rearward side of said head, a first support positioned between the rearward side of said head and the rearward end of said shoe, a first guide carried by said support and slidably engageable with said first slideway, means securing said support relative to said shoe, said last named means embodying spaced sockets each of oval formation in cross section on said first support and bolt and nut assemblies supported in said sockets, a second slideway on the forward side of said head, a second support embodying a horizontal leg and a vertical leg positioned between the forward side of said head and inwardly of and spaced from the forward end of said shoe with the horizontal leg resting upon said shoe and the vertical leg facing said second slideway, a second guide slidably engageable with said second slideway and adjustably connected to the vertical leg of said second support, and means adjustably securing the horizontal leg of said second support relative to said shoe.

References Cited in the file of this patent

UNITED STATES PATENTS 1,027,463   Crowder ---------------- May 28, 1912